UNITED STATES PATENT OFFICE 2,518,312

RECOVERY OF MALEIC OR PHTHALIC ANHYDRIDE FROM WET PROCESS GAS MIXTURES

Martval John Paul Hartig, Kearny, N. J., assignor to E. I. du Pont de Nemours & Company, Wilmington, Del., a corporation of Delaware No Drawing. Application June 16, 1947,
Serial No. 755,014

12 Claims. (Cl. 183—114.2)

This invention relates to a process for the recovery of maleic or phthalic anhydride from water-containing process gases. More particularly, it relates to the recovery of maleic or phthalic anhydride from wet process gases containing small quantities of the anhydride.

Maleic or phthalic anhydride are commercially manufactured by the catalytic oxidation of organic hydrocarbons, such as benzene and naphthalene, over selected catalysts. The anhydride is withdrawn from the reactors in vapor form as a constituent of a process gas containing in addition water, oxygen, nitrogen, carbon dioxide, and other gases. Under certain conditions of reaction, traces of quinones, phenols, aldehydes, and other by-products may also be present in the process gas. The control of the oxidation reaction is greatly facilitated by using very low ratios of the organic hydrocarbon to air. However, this results in very low concentrations of anhydride in the process gas.

Heretofore phthalic anhydride has been recovered by direct condensation. This method is, however, very inefficient in cases where the concentration of phthalic anhydride in the process gas is very low. To achieve the separation of phthalic anhydride from such process gas it has been suggested to convert the said anhydride to phthalic acid, to separate the acid by condensation, followed by the dehydration of the acid.

Recovery of maleic anhydride from process gas, containing low concentrations of maleic anhydride, by direct condensation is not commercially feasible. The vapor pressure of maleic anhydride is too high to efficiently recover maleic anhydride at any easily obtainable temperature. Furthermore, unless special precautions are taken, water will simultaneously condense and the anhydride will be converted to maleic acid. Heretofore maleic anhydride had been recovered from process gas by absorption of the anhydride in water wherein it is converted to maleic acid. This acid is then recovered and dehydrated to maleic anhydride. This method has many disadvantages. Difficult corrosion problems are encountered in handling the strong acid solution that is formed. Metal salts formed as the result of such corrosion may catalyze degradation of the maleic acid in subsequent processing steps. Frequently these salts are, or may form, colored substances which contaminate the end product. The extremely high solubility of maleic acid in water prevents recovery of the acid by crystallization methods, and necessitates evaporation of the solution to dryness; thus all high boiling impurities are retained in the cake. The high temperature encountered in evaporation favors the isomerization of maleic acid to fumaric acid. This isomerization may reach considerable proportions. The conversion of fumaric acid to maleic anhydride, while possible, requires very high temperatures, and is accompanied by degradation of the product and low yields. Maleic anhydride recovered from process gas by the water absorption method must be further purified before it is suitable for use in manufacture of quality products as resins, polymers, tanning agents, and the like.

It is an object of this invention to provide an improved method for the recovery of maleic or phthalic anhydride from process gas streams containing small quantities of the anhydride, and containing water. It is a further object of this invention to provide a method for the recovery of maleic or phthalic anhydride from such process gases without interim formation of the corresponding acid. It is a further object of this invention to provide a novel step in an economical process for the production of exceptionally pure maleic or phthalic anhydride in high yields.

These and other objects are accomplished according to the present invention by the adsorption of an anhydride from the group consisting of maleic and phthalic anhydrides, from a wet process gas mixture on an adsorbent at a temperature at or above that at which the said adsorbent adsorbs a maximum of 2 percent by weight of water and below a temperature of 130° C.; and removal of the said anhydride from the said adsorbent.

The following examples will serve to illustrate this invention:

*Example I*

A process gas containing 0.5 mol percent maleic anhydride, 2.5 mol percent water, and 97.0 mol percent air was treated as follows: The process gas was passed at a rate of 225 feet per minute through an activated carbon adsorption bed one foot deep and comprising 4–14 mesh solvent recovery grade activated carbon. The adsorption temperature was 100° C. at which temperature the relative humidity of the process gas was 2.5%; under these conditions substantially no water was adsorbed by the activated carbon. After 30 minutes the adsorption was terminated. Maleic anhydride was desorbed by heating the adsorption bed for one-half hour to 250° C. while under 1 mm. mercury pressure. Five such cycles were carried out using the same adsorption bed. The results obtained are as follows:

| Adsorption cycle | 1 | 2 | 3 | 4 | 5 | Total |
|---|---|---|---|---|---|---|
| Running time, Minutes | 30.0 | 30.0 | 30.0 | 30.0 | 30.0 | 150.0 |
| Anhydride adsorption in—grams | 6.13 | 6.14 | 6.36 | 5.59 | 6.51 | 30.73 |
| Anhydride break-through in—grams | 0.03 | 0.05 | 0.02 | 0.05 | 0.07 | 0.22 |
| Percent anhydride adsorbed | 99.6 | 99.2 | 99.7 | 99.1 | 99.0 | 99.3 |
| Overall recovery: | | | | | | |
| Grams | 5.99 | 5.37 | 5.67 | 6.46 | 6.52 | 30.01 |
| Percent | | | | | | 97.8 |

The product was pure white in color and did not discolor on aging. It was free from degradation products, and contained no measurable maleic or fumaric acid. It was suitable for use as an ingredient in the manufacture of light colored polymeric materials.

*Example II*

A process gas of the following composition resulted from the catalytic oxidation of benzene over a selected catalyst:

| | |
|---|---|
| Maleic anhydride | 0.5 mol percent |
| Water | 3.0 mol percent |
| Carbon dioxide | 2.0 mol percent |
| Oxygen | 16.0 mol percent |
| Quinone | trace |
| Aldehydes | trace |
| Other by-products | trace |
| Noble gases | trace |
| Nitrogen | remainder |

The process gas, leaving the reactors at 450° C., was cooled to 70° C. where its relative humidity was 9.8%. This gas was passed through a pair of activated carbon adsorption beds, connected in series, at a rate of 273 feet per minute and until the beds indicated a 35% weight increase. Under these conditions less than 1% water by weight of adsorbent was adsorbed. The process gas was then diverted to an identical adsorption bed system containing fresh activated carbon; in this manner continuous adsorption was achieved.

Maleic anhydride was desorbed by heating the adsorption beds to 200° C., and passing dry nitrogen through the beds. The nitrogen stream containing a high concentration of maleic anhydride was passed through a tubular condensor, and the maleic anhydride was condensed. By maintaining the condensor exit gas temperature at 55° C. the maleic anhydride condensed as a liquid, which was charged into suitable containers. The condensor exit gases were recirculated and added to the process gas entering the adsorption beds.

The maleic anhydride was pure white, and contained no maleic or fumaric acid or degradation products. It melted at 53.8° C. and required no further refining.

*Example III*

A process gas of the following composition resulted from the catalytic oxidation of naphthalene over a selected catalyst.

| | |
|---|---|
| Phthalic anhydride | 0.1 mol percent |
| Water | 0.3 mol percent |
| Carbon dioxide | 0.3 mol percent |
| Oxygen | 20.2 mol percent |
| By-products | trace |
| Noble gases | trace |
| Nitrogen | remainder |

This process gas was passed through an activated carbon adsorption bed at a temperature of 100° C. and at a rate of 240 feet per minute until the bed showed a 30% weight increase. At 100° C. the relative humidity of this process gas was 0.3%; under these conditions substantially no water was adsorbed. The process gas was then diverted to an identical adsorption bed.

Phthalic anhydride was desorbed by reducing pressure in the loaded bed to 5 mm. mercury pressure, and heating the bed to 250° C. Desorbed phthalic anhydride was condensed at 90° C. as a solid, and the condensor discharge recirculated to the adsorbers. Overall recovery efficiency was 99.2%. The product was exceptionally free from color and other impurities.

In an attempt to recover phthalic anhydride from the process gas by direct condensation at 40° C., the overall recovery efficiency was only 87%. Furthermore, enormous quantities of coolant were required to achieve this low condensation temperature.

*Example IV*

The experiment in Example I using silica gel as the adsorbent in place of activated carbon was repeated. The overall recovery was 97.2% and the quality of product was comparable.

*Example V*

A process gas of the following composition resulted from the catalytic oxidation of benzene over a selected catalyst in which steam was injected to improve reaction.

| | |
|---|---|
| Maleic anhydride | 0.6 mol percent |
| Water | 10.0 mol percent |
| Carbon dioxide | 2.0 mol percent |
| Oxygen | 15.7 mol percent |
| By-products | trace |
| Noble gases | trace |
| Nitrogen | remainder |

The process gas was cooled to 75° C. and passed at the rate of 290 feet per minute through a pair of activated carbon adsorption beds connected in series. At 75° C. the relative humidity of this process gas was 25.3%; under these conditions less than 2% water by weight of activated carbon was adsorbed. Upon a 30% weight increase of the adsorption beds the gas stream was diverted to a similar pair of adsorption beds. Maleic anhydride was desorbed by heating the beds to 180° C. while under a 5 mm. mercury pressure; the maleic anhydride was condensed as a liquid at 55° C., and the condensor effluent recirculated. The product was free from degradation products as well as maleic and fumaric acid. It was pure white in color and did not darken on aging. The melting point of the product was 53.9° C.

It will be apparent that the preceding examples are merely illustrative and the present invention broadly comprises the adsorption of an anhydride from the group consisting of maleic and phthalic anhydrides, from wet process gas mixture on an adsorbent at a temperature at, or above that at which the said adsorbent adsorbs a maximum of 2 percent by weight of water and below a temperature of 130° C., and removal of the said anhydride from the said adsorbent.

The rate of flow of the process gas through the adsorption bed is dependent upon the depth of the bed and the temperature of adsorption. Generally one would use as high a rate as possible and with the conventional adsorber this would be approximately 300 feet per minute. The rate is limited on the low side by economy of operation and on the high side by the maximum rate that may be attained without anhydride breakthrough.

The adsorption temperature is limited to a minimum figure, dependent upon the adsorbent used, and is fixed to eliminate adsorption of more than 2% water by weight of adsorbent. If greater than this amount of water were allowed to adsorb on the bed, the anhydride would be converted to the corresponding acid, and could not be recovered as anhydride in the subsequent steps of the process of this invention. Where 2% or less water is adsorbed, there may be some formation of acid by hydration, but this acid is dehydrated without further treatment in the desorption step. The small quantities of water formed by such dehydration during desorption do not condense and the pure anhydride is obtained. If the formation and recovery of acid is not objectionable, temperatures below this minimum may be employed. The anhydride could then be obtained by a separate dehydration step. Even this method would present a decided advantage over the water adsorption method of the prior art by eliminating the necessity for handling large quantities of water.

The minimum temperature of adsorption is that at which 2% water by weight of adsorbent will be adsorbed. This minimum temperature will vary with the relative humidity of the process gas being treated, and is calculated from the process gas analysis. If activated carbon is being used as an adsorbent, the minimum temperature of adsorption will be that at which the relative humidity of the process gas is 30%, because activated carbon will not adsorb more than 2% water from gases whose relative humidity is 30% or below. Using activated carbon the minimum temperature of adsorption may be calculated as follows:

Multiply the mol fraction of water in the process gas by the total pressure of the gas (in most cases this will be 760 mm. mercury pressure) and divide this figure by 0.30. Apply the resulting quotient (vapor pressure) to the table found on pp. 1739–1746 in the "Handbook of Chemistry & Physics" 27th edition 1943–1944, or comparable water vapor pressure table to find the corresponding temperature. This is the minimum adsorption temperature. Relative humidity is defined as the ratio of the pressure of water vapor present to the pressure of saturated water vapor at the same temperature.

The maximum temperature of adsorption is limited for practical reasons to 130° C. It has been found that above this temperature the adsorption of the anhydride becomes inefficient. It is preferable to conduct the adsorption at temperatures between 70° C. and 120° C.

Adsorbed anhydride is removed from the adsorbent by heating the adsorption bed at a temperature of 140° C.–280° C. This removal is facilitated through use of reduced pressure or by sweeping the bed with a dry inert gas such as nitrogen. Hydrogen, carbon monoxide, carbon dioxide, air, water-free vapors of hydrocarbons, ethers, esters, ketones, halogenated compounds, as well as similar materials which will not react with the anhydride under recovery conditions may also be employed as a sweep gas. These latter compounds should not dissolve appreciable amounts of water under the recovery conditions. The sweeping gases or vapors may be used in conjunction with a partial vacuum. Also, a high boiling organic liquid, such as diphenyl oxide, may be condensed upon the adsorbent bed whereupon it displaces the anhydride for subsequent recovery. In another method, the adsorbent bed may be leached of anhydride at ordinary temperature with a suitable anhydrous liquid organic solvent. In all but the last case evolved anhydride is collected by condensation.

Removal of adsorbed anhydride at temperatures below 140° C. is a commercially uneconomically slow process. Exposure of the anhydride to heat for the protracted periods necessary for recovery below 140° C. may result in decomposition, with the resultant contamination of product and lowering of yield. Temperatures above 280° C. should not be employed for desorption, in that decomposition of the anhydride may occur and no practical increase in rate of removal of the anhydride from the adsorbent is achieved. It is preferred that the anhydride be removed from adsorbent at temperatures between 160° C. and 250° C.

The anhydride may be condensed in any type condensor conventionally used for such purpose. If possible it is preferred that the temperature of condensation be adjusted so that the anhydride is recovered in the liquid state. For maleic anhydride this is realized if the condensor exit is maintained at approximately 55° C.; for phthalic anhydride at 135° C. It is desirable to recirculate the condensor discharge to the adsorption bed, especially where condensation temperatures are relatively high. Solid product may be collected if desired, and this may be scraped or melted from the condensor.

Activated carbon is the preferred adsorbent for use in this invention. It will adsorb the anhydride effectively, and readily lose it under the removal conditions. Low ash content or solvent recovery grade activated carbon is preferred. It has been found that silica gel can also be used if the relative humidity of the process gas is 10% or less, and the minimum temperature of adsorption is not less than 90° C. because silica gel will not adsorb more than 2% water under these conditions. If silica gel is to be used the minimum adsorption temperature is that at which the relative humidity of the process gas is 10%, but not less than 90° C. Adsorbents such as activated alumina, activated bauxite, and the like, are not operable for these materials exhibit an affinity for water under the conditions of recovery herein disclosed and will not adsorb the anhydride. Fuller's earth, activated clays, etc. are not operable as they are slightly basic in character and may degrade the adsorbed anhydride.

The process of this invention makes possible economical recovery of maleic or phthalic anhydride from wet process gas containing very low percentages of the anhydride. This fact makes possible a considerable improvement in the present known method for manufacture of these anhydrides by the process of catalytic oxidation of organic compounds. Lower than conventional ratios of organic compound to air may be used to improve yields, as well as facilitate the temperature control in the oxidation reaction. This permits use of less complex apparatus for the oxidation reaction, and the elimination of wide temperature fluctuations which results in decreased degradation and by-products.

The process of this invention is free from all of the disadvantages heretofore mentioned as inherent in the water absorption process, and considerable economic advantage results from elimination of the separate dehydration step. The high recovery efficiency of this process in separating maleic or phthalic anhydride from process gases containing a very low concentration of anhydride proves decidedly advantageous when compared to the direct condensation process.

As many apparently widely different embodiments of this invention may be made without departing from the spirit and scope thereof, it is to be understood that I do not limit myself to the specific embodiments thereof except as defined in the appended claims.

I claim:

1. The method of recovering an anhydride from the group consisting of maleic and phthalic anhydride, from a wet process gas mixture containing said anhydride, which process comprises adsorbing said anhydride on an adsorbent from the group consisting of activated carbon and silica gel, at a temperature above that at which said adsorbent adsorbs a maximum of 2% by weight of water and below 130° C., and removing said anhydride from said adsorbent.

2. The method as set forth in claim 1 wherein said adsorbent is heated to 140° C.–280° C. to remove said anhydride therefrom.

3. The method as set forth in claim 2 wherein said anhydride is maleic anhydride.

4. The method as set forth in claim 2 wherein said anhydride is phthalic anhydride.

5. The method as set forth in claim 2 wherein said adsorbent is activated carbon.

6. The method as set forth in claim 2 wherein said anhydride is silica gel.

7. The method of recovering an anhydride from the group consisting of maleic and phthalic anhydrides from a wet process gas mixture containing said anhydride, which process comprises adsorbing said anhydride on activated carbon at a temperature above that at which the relative humidity of said gas mixture is 30%, and below 130° C., and removing said anhydride from said activated carbon.

8. The method as set forth in claim 7 wherein said activated carbon is heated to 140° C.–280° C. to remove said anhydride therefrom.

9. The method as set forth in claim 8 wherein said anhydride is maleic anhydride.

10. The method as set forth in claim 7 wherein said anhydride is phthalic anhydride.

11. The method of recovering an anhydride from the group consisting of maleic and phthalic anhydrides, from a wet process gas mixture containing said anhydride, which process comprises adsorbing said anhydride on silica gel at a temperature above 90° C. and that at which the relative humidity of said gas mixture is 10%, and below 130° C., and removing said anhydride from said silica gel.

12. The method as set forth in claim 11 wherein said silica gel is heated to 140° C.–280° C. to remove said anhydride therefrom.

MARTVAL JOHN PAUL HARTIG.

REFERENCES CITED

The following references are of record in the file of this patent:

UNITED STATES PATENTS

| Number | Name | Date |
| --- | --- | --- |
| 1,742,247 | Godel | Jan. 7, 1930 |

OTHER REFERENCES

"Charcoal as an Adsorbent," J. B. Garner, Natural Gas, Nov. 1924, pages 3 and 4.